(No Model.)
W. H. SHAW.
FAUCET.
No. 407,495. Patented July 23, 1889.
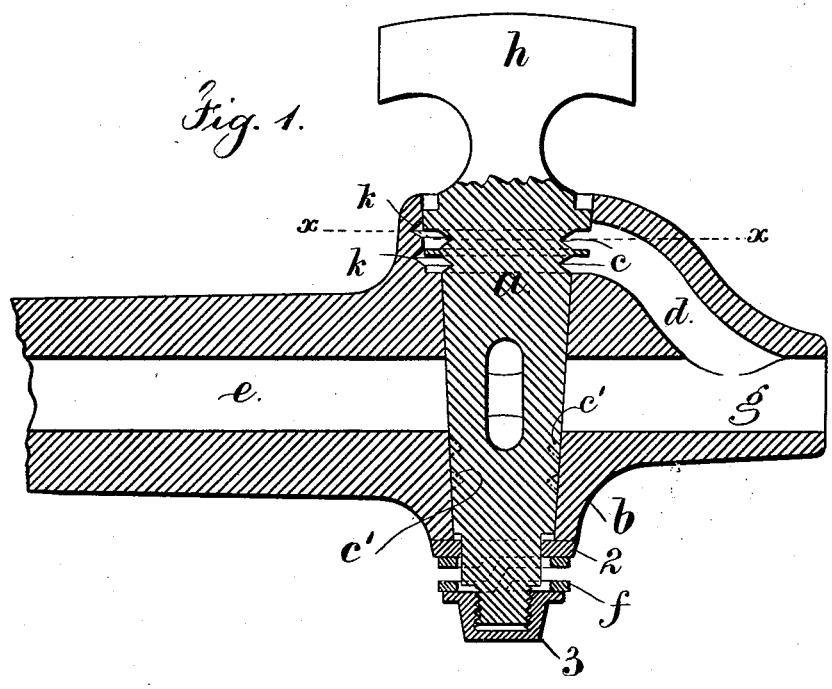
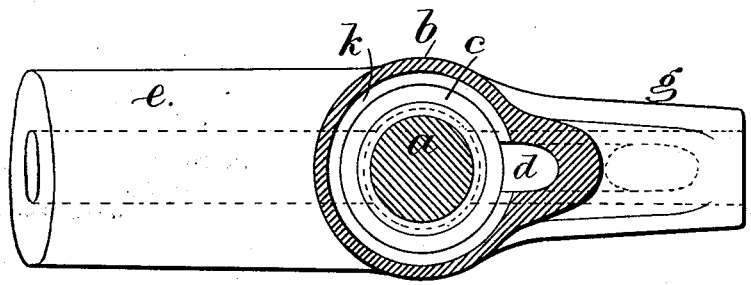
Witnesses
Chas H Smith
J. Staib
Inventor.
William H. Shaw.
per Lemuel W. Serrell
atty.

UNITED STATES PATENT OFFICE.

WILLIAM H. SHAW, OF BROOKLYN, NEW YORK, ASSIGNOR TO HIMSELF AND JOHN NOERMAN, OF SAME PLACE.

FAUCET.

SPECIFICATION forming part of Letters Patent No. 407,495, dated July 23, 1889.

Application filed April 29, 1889. Serial No. 309,022. (No model.)

*To all whom it may concern:*

Be it known that I, WILLIAM H. SHAW, of Brooklyn, in the county of Kings and State of New York, have invented an Improvement in Faucets for Beer and Similar Liquids, of which the following is a specification.

In drawing beer from a barrel through a faucet difficulty is experienced in consequence of the beer frothing and becoming mixed with the atmosphere, and this is especially the case when the beer is first tapped, and loss results from the fact that the froth cannot be measured and has to be thrown away before the beer can be drawn in a sufficiently liquid condition to be properly measured.

The object of my present invention is to prevent the formation or development of froth in the drawing of the beer. I have discovered that the froth is formed by the issuing of a small jet under a heavy pressure, especially where the jet is restricted in its movement by striking against the opposite side of the faucet or other surface, so that it rebounds and forms bubbles and froth. To prevent this operation, I check the momentum of the beer by diffusing it as a film upon an increasingly large area, and I allow the beer to trickle over the surface with a comparatively slow movement, and the beer in adhering to the surface is not commingled with the atmosphere to any considerable extent, and by the time the beer reaches the discharge-orifice it is moving at such a slow speed that frothing is effectually prevented.

In carrying out my invention I provide an endwise-movable plug to the faucet, so that instead of turning the faucet to allow the beer to discharge I move the plug endwise, and in so doing open a passage-way which is very thin, and the beer spreads in all directions around the plug of the faucet, and the speed of the liquid decreases the farther it spreads from the point of admission, and I provide in the plug or in the barrel, or both, annular recesses, into which the beer passes and runs slowly to the discharge-orifice. By this means the beer travels upon the surface of the metal in a thin film, and it is not discharged as a jet at any point;
hence the formation of foam is avoided, and after the measure has been filled or nearly filled the faucet can be turned to admit the jet under pressure to pass into the measure to cause the beer to foam sufficiently to be acceptable to the person using the same.

In the drawings, Figure 1 is a section longitudinally of the improved faucet, and Fig. 2 is a transverse section at the line $x\ x$.

The faucet-plug $a$ is to be of any desired size or shape, and it fits within the barrel $b$, and is ground to place, as usual. At one end of the plug $a$ is a T-head or turner $h$, and at the other end is a washer 2, a spring $f$, and a nut 3, the spring acting against the washer 2 to keep it tightly against the end of the barrel $b$ and the nut 3 being upon a screw at the end of the plug $a$. Around the plug $a$ are annular grooves $c$, which grooves may be near the larger end, as represented in full lines, or they may be near the smaller end, as represented by dotted lines at $c'$, or they may be near both ends of the plug $a$, and within the barrel there are annular grooves $k$, that open into the channel $d$, which passes to the bib or delivery-pipe $g$.

It will now be understood that when the faucet is closed the spring $f$ draws the barrel $a$ endwise and prevents the passage of liquid from the supply-pipe $e$ of the faucet, and when beer or similar liquid is to be drawn the T-head or turner $h$ is grasped and the plug $a$ drawn endwise against the action of the spring $f$, and in consequence of the plug $a$ being tapering there will be a narrow or thin space all around the plug $a$ when this end movement is given to said plug, and the beer will pass out laterally from the supply-pipe $e$ and spread all around the plug $a$, and it will pass endwise of such plug into the grooves $c$ and by the passage $d$ to the bib $g$, in addition to the liquid passing directly to such passage $g$ adjacent to the plug $a$, and in this manner the beer will travel upon the metallic surfaces in a thin film and will adhere thereto by the capillary attraction, and will not become mixed with the atmosphere or turned into froth to any appreciable extent, and when the desired quantity of beer has been drawn in this manner the plug $a$ can be turned to allow the discharge of the beer as a jet into the measure for livening up or causing the beer to froth to whatever extent may be desired.

I claim as my invention—

1. The combination, with the faucet-barrel $b$, of the plug $a$, having around it grooves, and the spring $f$, whereby an end movement is allowed to the faucet for the passage of the beer or similar liquid around the plug without turning the same, substantially as set forth.

2. The faucet having a barrel $b$, plug $a$, and spring $f$, there being grooves around the plug or within the barrel, or both, for the passage of liquid when an end motion is given to the plug, substantially as set forth.

3. The combination, with the plug $a$ and spring $f$, of the barrel $b$, having grooves around within the same, and the passage $d$, extending to the bib or delivery-pipe of the faucet, substantially as set forth.

Signed by me this 22d day of April, 1889.

WILLIAM H. SHAW.

Witnesses:
J. D. H. BERGEN,
THOMAS BEECH.